(12) United States Patent
Stanislaus et al.

(10) Patent No.: US 9,755,899 B2
(45) Date of Patent: Sep. 5, 2017

(54) GENERATION AND USAGE OF MOBILITY VLAN ID VERSION VALUE

(75) Inventors: William Stanislaus, Fremont, CA (US); Seemant Choudhary, Fremont, CA (US); Vivek L. Atreya, Vyalikaval Bangalore (IN); Shashi H. Ankaiah, Karnataka (IN)

(73) Assignee: Avaya Inc., Basking Ridge, NJ (US)

( * ) Notice: Subject to any disclaimer, the term of this patent is extended or adjusted under 35 U.S.C. 154(b) by 992 days.

(21) Appl. No.: 12/777,028

(22) Filed: May 10, 2010

(65) Prior Publication Data
US 2010/0290348 A1    Nov. 18, 2010

Related U.S. Application Data

(60) Provisional application No. 61/178,288, filed on May 14, 2009.

(51) Int. Cl.
*H04L 12/24* (2006.01)
*H04L 12/46* (2006.01)

(52) U.S. Cl.
CPC ........ *H04L 41/082* (2013.01); *H04L 12/4641* (2013.01)

(58) Field of Classification Search
None
See application file for complete search history.

(56) References Cited

U.S. PATENT DOCUMENTS 5,910,955 A * 6/1999 Nishimura et al. ........... 370/401
6,304,901 B1 * 10/2001 McCloghrie et al. ........ 709/221
7,406,034 B1 * 7/2008 Cometto et al. .............. 370/218
7,505,434 B1    3/2009 Backes
7,701,912 B2    4/2010 Thompson et al.
7,804,806 B2    9/2010 Borkar et al.
(Continued)

FOREIGN PATENT DOCUMENTS

CN    101102611 A    1/2008
WO    2008005794 A2    1/2008

OTHER PUBLICATIONS

Lopata, Robert J.; Office Action; dated May 31, 2012; U.S. Pat. No. 8,477,775; United States Patent and Trademark Office; Alexandria, Virginia.

(Continued)

*Primary Examiner* — Chirag Shah
*Assistant Examiner* — Joshua Smith (57) ABSTRACT

A mobility network architecture includes a control plane and data plane. The control plane supports notification of VLAN configurations. The data plane supports routing of data amongst VLANs. Each VLAN has an associated identifier value as well as a version number. The version number for a respective VLAN can be updated to a new value each time there is a change to the VLAN. Typically, a controller communicates over the control plane to notify each member switch when a version number has changed for a VLAN. If controller notification fails, a member switch can receive a notification from a neighboring switch that the version number for a VLAN has been modified. In response to detecting such a condition, the switch receiving the notification can prevent forwarding of data even though the switch does not receive notification from the controller that the version number for the VLAN has changed.

17 Claims, 8 Drawing Sheets

| | VLAN INFORMATION 205 | |
|---|---|---|
| NAME | VLANID | VERSION |
| ⋮ | ⋮ | ⋮ |
| VLAN_A | 2 | 1 |
| VLAN_RED | 3 | 1 |
| VLAN_CORP | 5 | 4 |
| ⋮ | ⋮ | ⋮ |

(56) References Cited

U.S. PATENT DOCUMENTS

| | | | |
|---|---|---|---|
| 7,826,869 | B2 | 11/2010 | Nagarajan et al. |
| 7,885,233 | B2 | 2/2011 | Nagarajan et al. |
| 7,911,982 | B1 * | 3/2011 | Dalvi et al. ............ 370/256 |
| 7,958,256 | B2 | 6/2011 | Keller |
| 8,125,903 | B2 * | 2/2012 | Godor et al. ............ 370/230.1 |
| 8,477,775 | B2 | 7/2013 | Choudhary et al. |
| 2002/0022483 | A1 | 2/2002 | Thompson et al. |
| 2005/0132166 | A1 * | 6/2005 | Saffre ............ 712/26 |
| 2005/0172128 | A1 * | 8/2005 | Little et al. ............ 713/168 |
| 2005/0174943 | A1 | 8/2005 | Wang |
| 2006/0056446 | A1 | 3/2006 | Lee et al. |
| 2007/0081477 | A1 | 4/2007 | Jakkahalli et al. |
| 2009/0310535 | A1 | 12/2009 | Anumala et al. |
| 2011/0004913 | A1 | 1/2011 | Nagarajan et al. |

OTHER PUBLICATIONS

Lopata, Robert J.; Final Office Action; dated Nov. 15, 2012; U.S. Pat. No. 8,477,775; United States Patent and Trademark Office; Alexandria, Virginia.

First Office Action; Chinese Patent Application No. 201010180307. 6; The State Intellectual Property Office of People's Republic of China.

European Search Report; dated Sep. 3, 2010; from EP Publication No. 2252096A1; for European Patent Application No. 10005017.8; European Patent Office; Munich, Germany.

* cited by examiner

Fig. 1

VLAN INFORMATION
205

| NAME | VLANID | VERSION |
|---|---|---|
| ... | ... | ... |
| VLAN_A | 2 | 1 |
| VLAN_RED | 3 | 1 |
| VLAN_CORP | 5 | 4 |
| ... | ... | ... |

GENERATION AND USAGE OF MOBILITY VLAN ID VERSION VALUE

CROSS REFERENCE TO RELATED APPLICATIONS

This patent application claims the benefit of earlier filed U.S. Provisional Patent Application Ser. No. 61/178,288 filed on May 14, 2009, entitled, "Generation and Usage of Mobility VLAN ID Generation Number," the entire teachings of which are hereby incorporated by this reference.

This application is related to patent application Ser. No. 12/776,897 filed on the same day as the present application, entitled "UNIFYING LOCAL AND MOBILITY NETWORK IDENTIFIERS," the entire teachings of which are hereby incorporated by this reference.

BACKGROUND

Personal wireless devices continue to gain popularity as they become smaller and more affordable to users. Use of such devices has become more affordable for a number of reasons. For example, infrastructure supporting mobile devices has expanded rapidly over the years. The expansion includes wireless network support, in the form of WiFi access points and more recently, WiMax coverage, etc. This expansion in the wireless network continues to increase the demand for wireless bandwidth and corresponding applications.

Wireless network support has spread to corporate enterprise networks. This may be in part due to decreasing hardware costs. Such a reduction in hardware costs enables wireless coverage in a campus or building environment for a multitude of employees. Therefore, wireless network coverage is now available to more people at reduced lower rates.

As the relative usage of wireless network access continues to rise in proportion to traditional wired connections offered by stationary devices, a network infrastructure can adapt by integrating wireless, or so-called mobility transport, with conventional wired access and switching.

To support transmission of data between a source and a destination, the network infrastructure as discussed above can include one or more so-called virtual local area networks. A conventional virtual local area network, commonly known as a VLAN, can include a group of computers that form a sub-network to communicate data amongst each other. In general, a VLAN may have attributes similar to a physical LAN, but a VLAN allows for end stations to be grouped together even if they are not located on the same network switch. Reconfiguration of a VLAN can be achieved via software instead of physically relocating devices in a network.

BRIEF DESCRIPTION

Embodiments herein deviate with respect to conventional applications of implementing and managing VLANs. For example, embodiments herein are directed to unique ways of keeping track of VLAN information and controlling flows of data traffic depending on whether a respective VLAN is modified.

More specifically, one embodiment herein includes operating a given switch to route data in a network amongst other switches. The given switch initially receives, from a VLAN controller in the network, a VLAN identifier and a corresponding version value for a respective VLAN in the network. The VLAN identifier can be used to route data in the network. The version value indicates a generation of the corresponding VLAN.

The network can include any number of VLANs. Thus, the given switch can receive a VLAN identifier and corresponding version number for each of multiple VLANs supported by the switch. The switch forwards data such as one or more data packets in the network over the VLANs based on use of respective VLAN identifiers.

Resources such as switches in the network can be notified of a change to a respective VLAN in a number of ways. For example, a network resource such as a switch can receive a notification from the controller or another switch that a version number for a respective VLAN has been updated or changed from a previous setting. A change in the version number indicates that an attribute of the VLAN has been modified.

In one embodiment, each switch in the network normally receives notifications from the controller regarding updates to version values for the VLANs. In other words, the controller generates a new version value for a corresponding VLAN identifier when a respective VLAN has been modified. The controller communicates the updated version information to the switches.

Each switch can be configured to keep track of identities of multiple other switches in the network that are members of a respective VLAN. In response to receiving an updated version value from the VLAN controller over a control plane of the network, the respective switch receiving the communication from the controller, in turn, communicates over a data plane of the network to notify each of the multiple remote switches that are member resources of the VLAN that the version value of a respective VLAN has been updated.

Assume in an example embodiment that the given switch receives a notification from a remote switch that the version value for a respective VLAN identifier has been updated. Assume further, due to a failure or other reason, that the given switch (different from the remote switch) does not receive notification from the controller of the updated version value. In response to detecting that the updated version value found in the notification as received from the first remote switch does not match the corresponding version value previously received from the VLAN controller, the given switch prevents forwarding of data on the VLAN to the first remote switch.

Accordingly, changing or updating of the version number can cause the given switch to prevent undesirable distribution of data. In other words, in response to receiving notification from a first remote switch that a current version value for the VLAN identifier has been updated to a new value that is different than the corresponding version value previously received from the VLAN controller, the given switch prevents forwarding of data to the first remote switch as the integrity of the corresponding VLAN cannot be trusted as it has changed. In one embodiment, the first remote switch transmits the notification to the given switch in response to the first remote switch receiving the updated version value from the VLAN controller.

Note that the given switch can also receive a notification from a second remote switch that supports the respective VLAN. The notification from the second remote switch can include a version value for the VLAN that matches the version value currently maintained by the given switch receiving the notification. Thus, the second remote switch may not be aware of the changes to the VLAN as it still advertises the old version value as being the current version value for the VLAN. The given switch compares the version value received from the second remote switch to the version value currently stored by the given switch. In response to detecting that the version value for the VLAN as received from the second remote switch matches a previously received version value from the VLAN controller, the given switch forwards the data over the VLAN to the second remote switch. Thus, the given switch can prevent forwarding of data to a first remote switch that is apparently no longer part of the VLAN; the given switch can forward the data to the second remote switch that still appears to be support the last version of the VLAN.

In further embodiments, in response to detecting that the updated version value received from the first remote switch does not match the corresponding version value previously received from the VLAN controller as discussed above, the given switch can initiate communications over a control plane of the network with the VLAN controller to confirm with the controller whether there are any changes to the VLAN as specified by the VLAN identifier. Accordingly, the given switch can attempt to communicate with the controller to determine whether there has been a change to the version number and/or respective VLAN configuration subsequent to being notified by a neighboring switch that the version number has been updated for a respective VLAN.

The given switch can be configured to keep track of identities of multiple remote switches that are member resources of the VLAN. Thus, prior to receiving the notification from the remote switch or the controller that the version number has changed, the given switch can initiate forwarding of data over the original configured VLAN through the network. In one embodiment, forwarding of data over the VLAN can include encapsulating an 802.3 communication to produce a data packet and inserting the VLAN identifier into the data packet for subsequent transmission of the data packet over a link or path such as a tunnel associated with the VLAN. Thus, the VLAN identifier can be used for routing of the data packet.

In one embodiment, the controller increments the version value for a respective VLAN identifier each time the VLAN is modified by the controller. As discussed above, the controller can be configured to attempt to communicate with switches in the network to provide notification that the version number has changed. As mentioned, if a direct attempt by the controller to notify member resources of a change to a VLAN, the switches can receive notification from other switches that there has been a change to a VLAN configuration.

The embodiments as described herein are advantageous over conventional techniques. For example, use of version information for a given VLAN identifier allows continued use of a respective VLAN identifier even though a configuration of a corresponding VLAN has changed. Moreover, use of version information can prevent forwarding of data traffic on VLANs for which respective configuration information has changed.

In one embodiment, the name associated with a VLAN is provided by a network administrator. The corresponding VLAN identifier is generated based on the storage index. When a VLAN is added for the first time, the version value for the respective VLAN identifier will be set to one. Each time the same mobility VLAN is reused, for example, based on deletion of a VLAN and addition of a new VLAN for the VLAN identifier, the VLAN identifier is reused and the version value for the VLAN identifier is incremented by one. The version value sets to zero after incrementing to a threshold value such as 0xF. As mentioned above, the version value for a respective VLAN identifier can be propagated with the VLAN name and VLAN identifier. The version value can be checked across devices such as switches to ensure the integrity and synchronization of devices supporting one or more VLANs.

These and other embodiment variations are discussed in more detail below.

As mentioned above, note that embodiments herein can include a configuration of one or more computerized devices, routers, network, workstations, handheld or laptop computers, or the like to carry out and/or support any or all of the method operations disclosed herein. In other words, one or more computerized devices or processors can be programmed and/or configured to operate as explained herein to carry out different embodiments of the invention.

Yet other embodiments herein include software programs to perform the steps and operations summarized above and disclosed in detail below. One such embodiment comprises a computer program product that has a computer-storage medium including computer program logic encoded thereon that, when performed in a computerized device having a processor and corresponding memory, programs the processor to perform any of the operations disclosed herein. Such arrangements are typically provided as software, code and/or other data (e.g., data structures) arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC). The software or firmware or other such configurations can be installed onto a computerized device to cause the computerized device to perform the techniques explained herein.

Accordingly, one particular embodiment of the present disclosure is directed to a computer program product that includes a computer readable storage medium having instructions stored thereon for supporting operations such as handling of event notifications generated based on an inability to carry out a software instruction. For example, in one embodiment, the instructions, when carried out by a processor of a respective computer device, cause the processor in a monitor resource to: receive, from a VLAN controller in the network, a VLAN identifier and a corresponding version value for a VLAN in the network; forward data in the network over the VLAN based on the VLAN identifier; receive a notification from a first remote switch, the notification including an updated version value for the VLAN; and in response to detecting that the updated version value in the notification received from the first remote switch does not match the corresponding version value received from the VLAN controller, prevent forwarding of data from the given switch to the first remote switch on the VLAN.

The ordering of the steps has been added for clarity sake. These steps can be performed in any suitable order.

Other embodiments of the present disclosure include software programs and/or respective hardware to perform any of the method embodiment steps and operations summarized above and disclosed in detail below.

Also, it is to be understood that the system, method, apparatus, instructions on computer readable storage media, etc., as discussed herein can be embodied strictly as a software program, as a hybrid of software and hardware, or as hardware alone such as within a processor, or within an operating system or a within a software application. As discussed above, techniques herein are well suited for use in software and/or hardware applications that facilitate lazy computations. However, it should be noted that embodiments herein are not limited to use in such applications and that the techniques discussed herein are well suited for other applications as well.

Additionally, although each of the different features, techniques, configurations, etc., herein may be discussed in different places of this disclosure, it is intended that each of the concepts can be executed independently of each other or in combination with each other. Accordingly, the one or more present inventions as described herein can be embodied and viewed in many different ways.

Also, note that this preliminary discussion of embodiments herein does not specify every embodiment and/or incrementally novel aspect of the present disclosure or claimed invention(s). Instead, this brief description only presents general embodiments and corresponding points of novelty over conventional techniques. For additional details and/or possible perspectives (permutations) of the invention(s), the reader is directed to the Detailed Description section and corresponding figures of the present disclosure as further discussed below.

BRIEF DESCRIPTION OF THE DRAWINGS

The foregoing and other objects, features, and advantages of the invention will be apparent from the following more particular description of preferred embodiments herein, as illustrated in the accompanying drawings in which like reference characters refer to the same parts throughout the different views. The drawings are not necessarily to scale, with emphasis instead being placed upon illustrating the embodiments, principles, concepts, etc.

DETAILED DESCRIPTION

According to embodiments herein, a mobility network architecture includes a control plane and a data plane. The control plane provides notification of VLAN configurations in the network. The data plane supports routing of data amongst VLANs in the network.

In one example embodiment, each of multiple switches in the network has an associated set of configuration information indicating one or more VLANs supported by the respective switch. The respective switch can be notified of VLAN configuration based on communications over a link such as the control plane. The respective switch forwards data packets from mobile users over the VLANs in the data plane.

Configurations of the one or more VLANs can change over time. For example, each VLAN has an associated identifier value as well as a version number for a respective VLAN supported by the switch. A controller managing a configuration of the VLANs updates the version number for a respective VLAN to a new value each time there is a change to a configuration of the VLAN. Based on distribution of VLAN version information, the controller attempts to communicate changes to the VLAN configuration over the control plane.

Due to a network failure, congestion, etc., a given switch in the network may not receive a formal notification from the controller over the control plane that a respective VLAN has been modified. The given switch can receive a notification from a neighboring switch or switch that supports the VLAN that the version number for the VLAN has been modified. In response to detecting that a version number for a VLAN has changed, the given switch receiving the notification can prevent forwarding of data over the VLAN to the switch providing the notification.

Accordingly, generation and use of version information for a given VLAN can allow continued use of VLAN identifier even though attributes of a respective VLAN have been changed. For example, the VLAN can be modified and tracked based on version information. Additionally, use of version information can prevent forwarding of data traffic on invalid VLANs.

Figure 1:
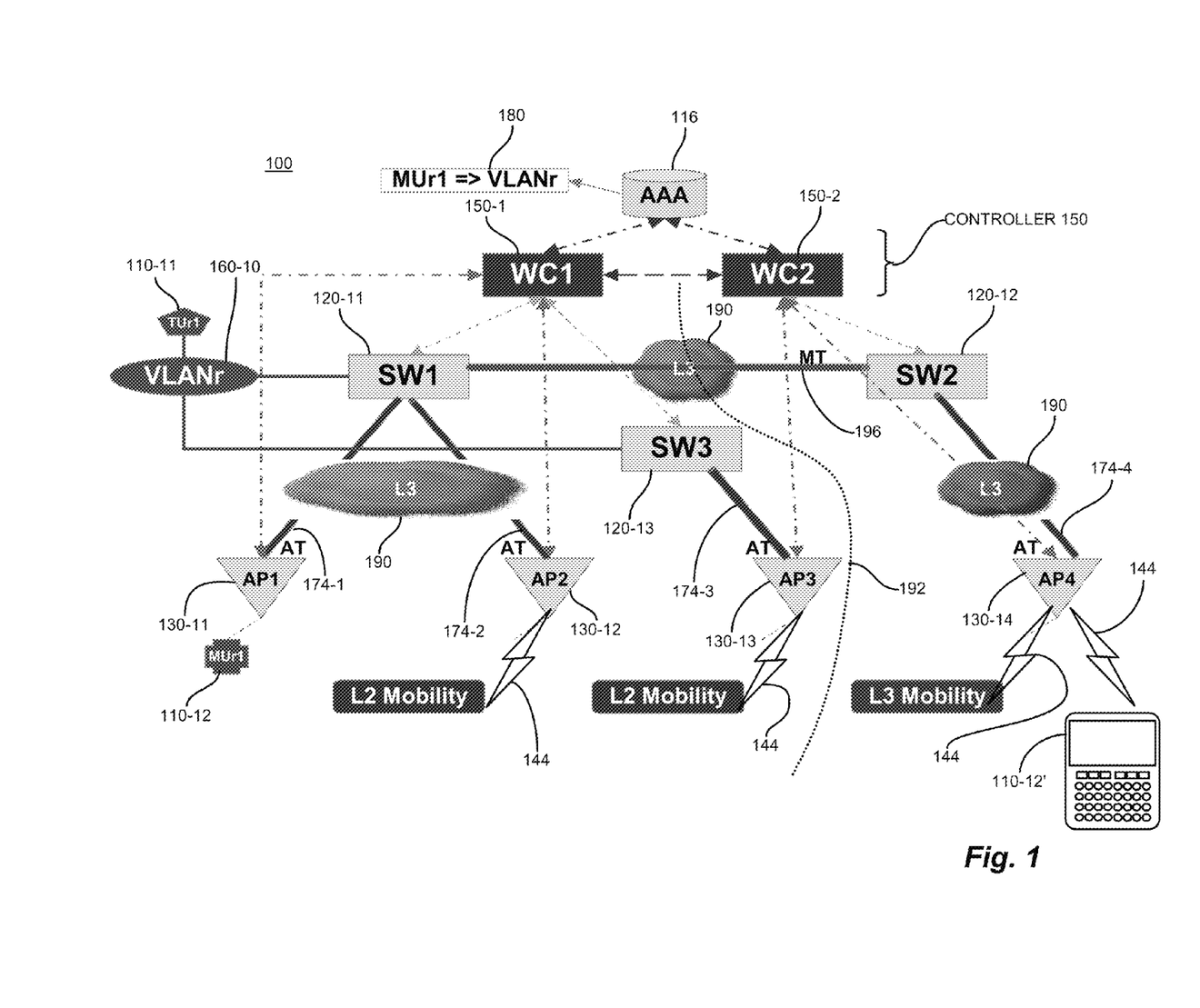
FIG. 1 is an example diagram of a network environment supporting one or more VLANs according to embodiments herein.

FIG. 1 is an example diagram illustrating network interconnectivity and use of VLAN version information according to embodiments herein.

As shown, network 100 can include a control plane (e.g., links depicted by dashed lines) and a data plane (e.g., links depicted by solid lines). In general, the control plane supports configuring and control of resources in network 100. The data plane supports transmission of data over one or more VLANs in the network amongst mobile users connected to network 100 via access points.

Network 100 or mobility domain can support multiple VLANs. For example, in one embodiment, the controllers 150 communicate with resources such as switches (e.g., SW1, SW2, SW3, . . . ) in the network 100 to configure the network 100 to include one or more VLANs. The network 100 is generally separable into distinct planes of parallel operations that occur in the wireless network defining the mobility domain 100. The configuration of VLANs can vary over time.

In one embodiment, switches 120-11 and 120-13 (SW1 and SW3) are servers for VLANr (160-10). It should be noted that virtual LANs can be primarily layer 2 constructs, compared with IP subnets which are layer 3 constructs, thus giving rise to mapping across L3 boundaries via tunnels.

Mobility switch 120-12 (SW2) connects via an L3 connection 190, thus defining L3 boundary 192. Mobile user 110-12 communicates to a corresponding wired user 110-11, as shown by the mapping of MUr1 to VLANr 160-10 in the VLAN mapping table 180.

Access points 130-11 . . . 130-13 connect to mobility switches SW1 and SW2 via access tunnels 174-1 . . . 174-3. The access tunnels 174-1 . . . 174-3 (174 generally) provide a transport for wireless frames from the access point 130 to the switching infrastructure of the core network 100. The access tunnels 174 therefore allow VLAN recognition through the L3 connection 190, thus effectively bridging L2 networks.

Similarly, a so-called mobility tunnel 196 effectively bridges the L3 boundary 192 by extending a VLAN 160 from one network (SW1, SW3) to another (SW2) to provide remote access to the remote VLAN for roaming. User 110-12 is afforded L2 mobility by access points 130-11 . . . 130-13 because of direct access to VLANr through SW1 or SW2 via L2 connectivity, as the VLAN visibility extends throughout the L2 network. The mobility tunnel 196 therefore extends VLANr to SW3, thereby providing L3 roaming capability if user 110-12 roams to a coverage area of access point AP4, shown as user110-12'.

In one embodiment, the access points 130 employ a mapping of MAC address to VLAN, IP address, or other suitable indexing to correlate the wireless link 144 to the corresponding tunnel 174 or connection. In one embodiment, the mobile devices 110 typically have a preassigned MAC address, and are allocated to a default or "home" VLAN by a predetermined assignment stored at the mobility controller and employed for defining the VLAN mapping table 180, as described above.

To facilitate the distribution of control information to the resources in network 100, controller 150 can be configured to communicate VLAN control and/or configuration information to the appropriate resources such as switches.

In one embodiment, controller 150 generates and assigns a corresponding name and a VLAN identifier to each VLAN in the network 100. Additionally, the controller 150 can generate a VLAN version value for each VLAN. The version value or number indicates a current version number or last known version number of the VLAN.

In one embodiment, the VLAN identifier is a multi-bit value such as a 12-bit value; a respective version number is a multi-bit value such as a 4-bit value. However, note that the VLAN identifier and respective version number generated by controller 150 may be of any suitable size.

The network 100 enables transmission of data amongst network resources depending on which of the multiple VLANs happens to be selected for use by a mobile user. In general, the controller 150 configures the resources in network 100 to form one or more VLANs. In one embodiment, the controller 150 communicates with the switches to notify them of the VLANs to be supported by the switches.

As discussed above, the VLANs in network 100 support transmission of data between mobile users 110 connected to the access points 130. In one embodiment, the mobile user selects a VLAN for communicating with a destination such as another mobile user. In one embodiment, the switches in network 100 route data based on use of a VLAN identifier value.

It is possible that the configuration of the network and/or configuration of a respective VLAN may be changed while a VLAN in the network 100 is in use. For example, a network administrator may modify a VLAN while data is being transmitted from a source mobile user to a destination mobile user over the VLAN. Embodiments herein include a way of preventing a flow of data on a particular VLAN if the particular VLAN happens to be concurrently modified by the master controller.

Figure 2:
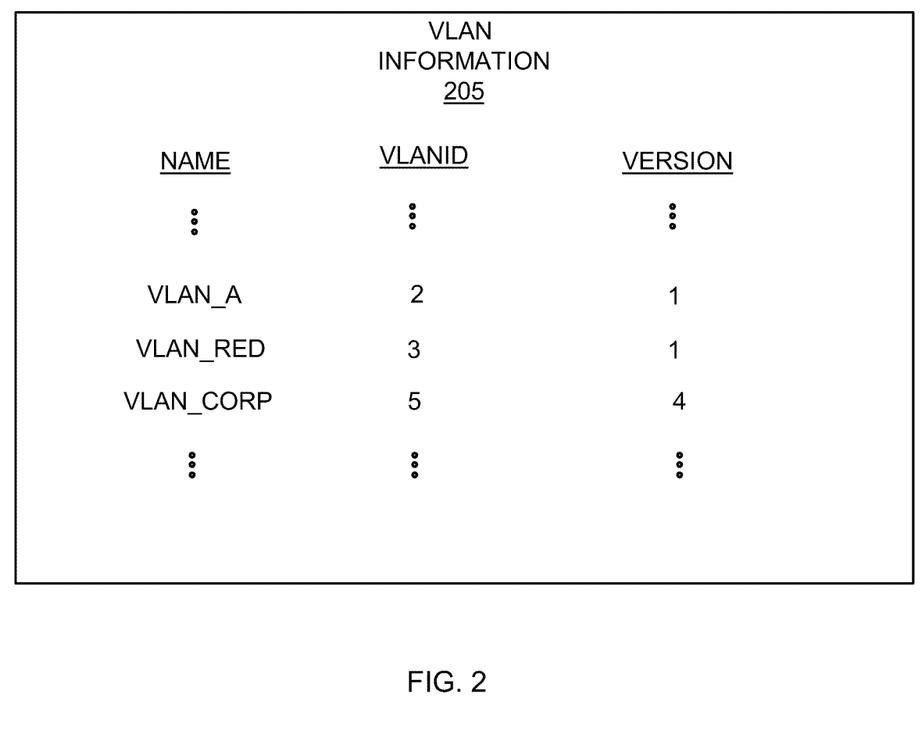
FIG. 2 is an example diagram of VLAN information according to embodiments herein.

More specifically, resources such as switches in network maintain a table of VLAN information 205 such as that shown in FIG. 2. Information maintained by a respective switch in network 100 can include information generated by and received from the controller 150 about the VLANs supported by the network.

As an example, in one embodiment, for each VLAN of multiple VLANs supported by a respective switch, the table includes multiple entries such as a name for a respective VLAN, an identifier for the respective VLAN, and a version value for the respective VLAN. As its name suggests, the VLAN name indicates a name of a VLAN. The name of a VLAN can be an alpha-numeric provided by an administrator. An administrator may prefer alpha-numeric types of names over numerical values as the alphanumeric names make it easier to keep track of different VLANs.

In one embodiment, the VLAN identifier is a multi-bit value used by the switches in the VLAN to forward respective data to a destination node in network 100 such as another mobile user.

The version value for a respective VLAN indicates a current known version of the VLAN identifier. As discussed below, the controller 150 updates a new VLAN version value each time the respective VLAN is modified.

Referring again to FIG. 1, one embodiment herein includes attempting to ensure that the VLAN information 205 as maintained by each of the switches are synchronized with each other. In one embodiment, the controller 150 communicates over a control plane of network 100 to notify switches of the VLAN information 205.

Based on the VLAN information 205, the switches in network 100 route data on respective VLANs using the VLAN identifier information.

For example, in one embodiment, an access point (AP) can receive an 802.11 communication from a mobile user. The access point converts the 802.11 communication into an 802.3 format. The access point then encapsulates the 802.3 formatted communication into a data packet for transmission over a respective VLAN in network 100. Use of the VLAN by the mobile user may require authentication from the controller 150 prior to use of the VLAN. In one embodiment, the data packet produced by the access point includes the VLAN identifier value of the VLAN on which the data packet is forwarded through network 100. The VLAN identified by the VLAN identifier in the data packet includes one or more links such as tunnels for routing of the data packet in the VLAN.

In addition to being notified by the controller 150 of the VLAN information 205 for routing of data amongst switches, the switches can be configured to occasionally or periodically communicate with other switches to confirm that the version of a respective VLAN has not changed. In other words, each switch communicates with other member switches supporting a respective VLAN of a last known version value for a respective VLAN.

As an example, the controller 150 can initiate distribution of the VLAN information 205 to each of multiple switches in the network 100. In one embodiment, the controller 150 initiates distribution of VLAN information to each switch that supports a respective VLAN.

After being configured by the controller 150 to support a VLAN, each switch in the VLAN periodically communicates with other member switches supporting the VLAN to indicate a current version value for the VLAN as well as the VLAN identifier for the VLAN. Upon receipt of such a message, the receiving switch (VLAN member) compares the version value for the VLAN to a last known version value stored or maintained in a table associated with the switch for the VLAN. Assuming there have been no changes to the VLAN, the VLAN version value maintained by the switch will be the same as the version value received from the VLAN member switch. This provides a level of confidence that the switches can safely forward data over the VLAN between a source resource and destination resource.

In one embodiment, router resources such as the switches in network 100 can be configured to communicate with each other in response to receiving updates with respect to a given VLAN. For example, the controller 150 can initiate distribution of new configuration information indicating that a particular VLAN has been updated. The notification from the controller 150 can include a new VLAN version number for a respective VLAN that is being modified. Upon receiving the notification of an update to a VLAN, the switch receiving the notification from the controller 150 updates its local table of VLAN information. Additionally, the switch receiving the updated VLAN information from the controller 150 can immediately initiate communications with other member switches that the version value for a respective VLAN has been updated.

In such an embodiment, the switch receiving the notification or advertisement from another switch compares the received version value in the notification to a version value for the VLAN currently stored in the respective table of the switch. As discussed below, if a received version value (e.g., updated version value received from another switch) does not match a current value tracked by a respective switch, the respective switch can prevent forwarding of data on the VLAN whose version number most recently changed. Thus, the switches can control forwarding of data depending on version information received from the controller 150 and/or version information received from other switches in the network 100.

As an example, assume that the VLAN controller 150 creates a VLAN named VLAN_RED and assigns an identifier value of 3 to VLAN_RED as shown in FIG. 2. Initially, the controller 150 assigns a version value of 1 to the identifier value of 3.

Figure 3:
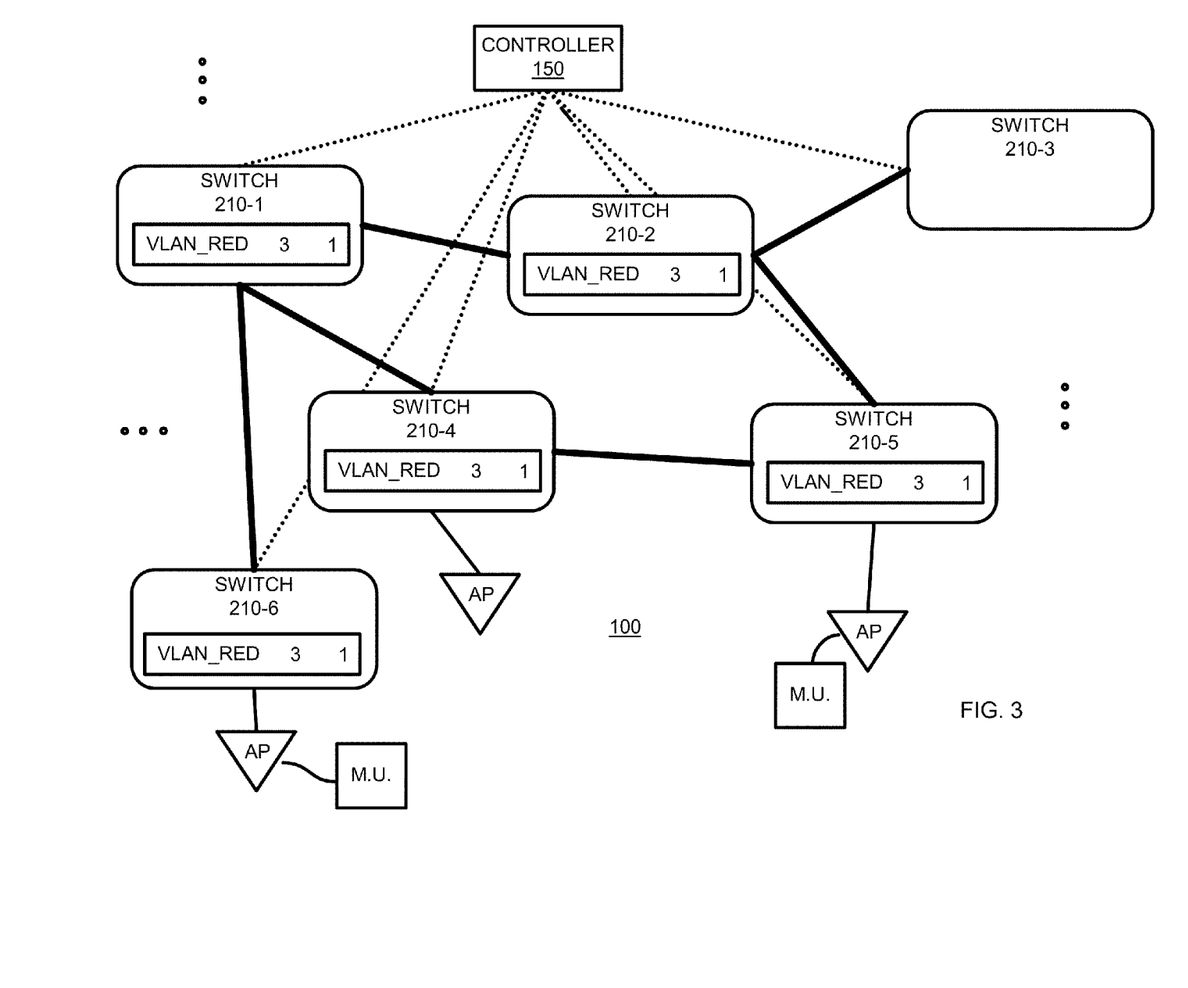
FIG. 3 is an example VLAN configuration amongst switches in a network according to embodiments herein.

As shown in FIG. 3, upon creation of VLAN_RED, the controller 150 notifies member switches that will support VLAN_RED in network 100 of a name of the VLAN (e.g., VLAN_RED), an identifier value of the VLAN (e.g., 3), and the version number for the VLAN (e.g., 1).

In one embodiment, the controller 150 also notifies each switch of connectivity with other switches in the network 100 that belong to the VLAN. For example, a given switch is notified of paths such as access and/or mobility tunnels to other switches that are to be part of a particular VLAN. Accordingly, each switch in network 100 has knowledge of a VLAN name, VLAN identifier value, VLAN version information as well as one or more corresponding links that are associated with that VLAN for forwarding of data.

In one embodiment, each switch that is a member of a respective VLAN includes information in its VLAN information table indicating a VLAN name, VLAN identifier value, and version information for the respective VLAN. As mentioned, the VLAN information for a respective switch can be stored in a local or remote repository.

As mentioned above, to ensure integrity of the VLANs in network 100, the switches in network 100 can be configured to occasionally or periodically transmit messages to the other member switches of the VLAN to confirm current existence of a respective VLAN. For example, each switch identifies member switches of a VLAN and occasionally sends an identifier value and a corresponding version number for the respective VLAN. Each receiving member VLAN switch compares the received version value to the identifier value for the VLAN in its own table. Assuming that there have been no changes to a VLAN_RED, the version value for a respective VLAN received from the other switches should match the value stored in the table of the receiving switch.

While VLAN_RED is being used to forward data between mobile units, a network administrator can initiate changes to the VLAN named VLAN_RED. Assume in this example that the network administrator makes a change to VLAN_RED. The change to VLAN_RED may be merely the name of the VLAN or underlying configuration of the VLAN in network 100.

In response to receiving input from the network administrator to change VLAN_RED to VLAN_GREEN, the controller 150 initiates communications with one or more member switches in network 100 over a control plane (e.g., dotted lines in FIGS. 3 and 4) to notify the member switches that the VLAN_RED is being modified.

Figure 4:
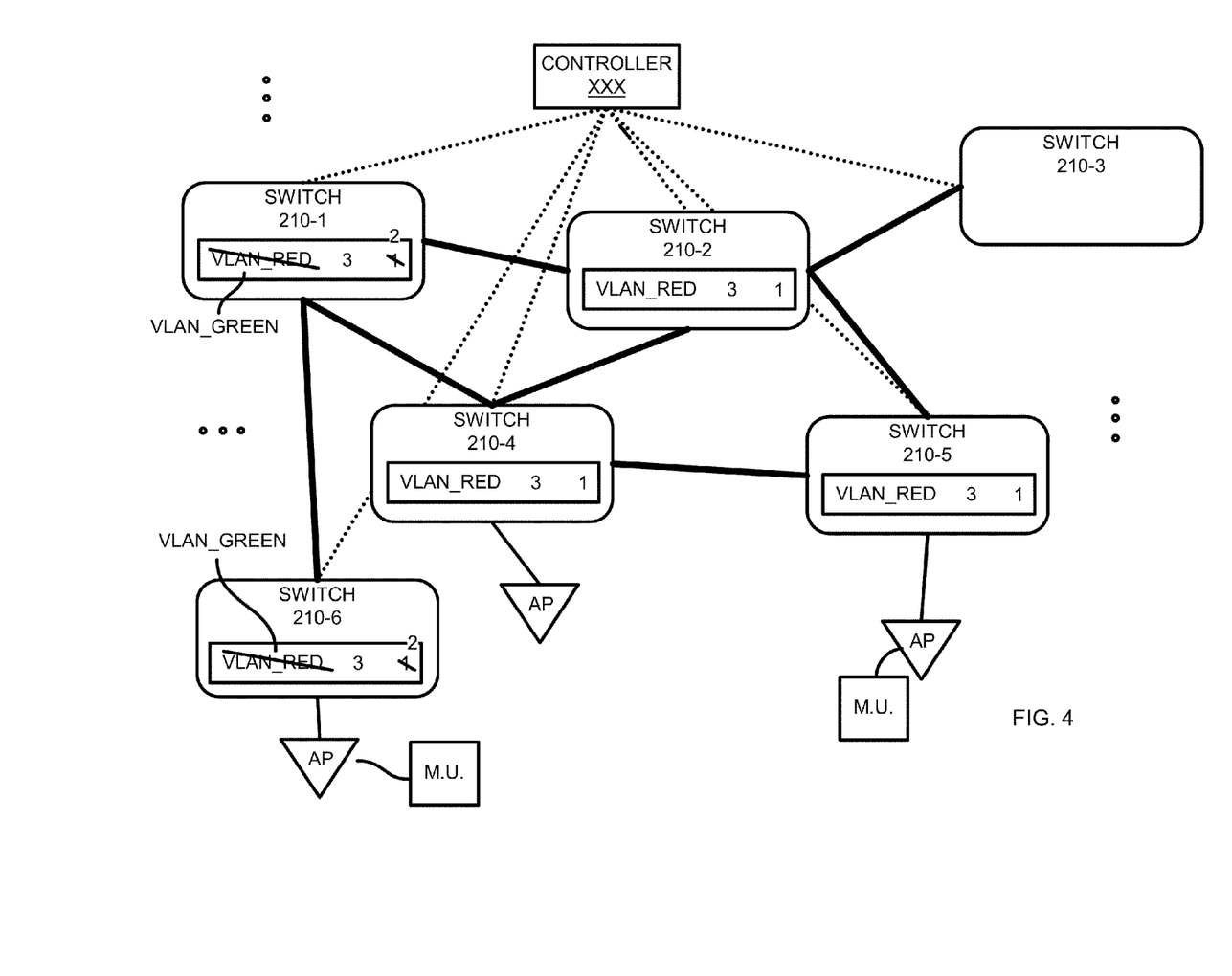
FIG. 4 is an example VLAN configuration amongst switches in a network according to embodiments herein.

In one embodiment, the controller 150 attempts to notify each of the switches that the VLAN having an identifier value of 3 (e.g., VLAN_RED) is now being modified. It is possible that certain switches will be notified of the change before others are notified. Also, it is possible that certain switches in the network may not receive a notification from the controller 150 due to a network failure, congestion, etc.

Upon receiving the notification from the controller 150 that the version value for a respective VLAN has been changed to a new value, each receiving switch generates an immediate notification message transmitted to other member switches of the VLAN. Accordingly, each member switch can be apprised of when the controller 150 makes a change to a respective VLAN even if the controller 150 does not communicate directly with a respective switch about the update to the VLAN.

If a switch receives notification from a member that a particular VLAN has been modified by the controller 150, the receiving member switch can prevent forwarding of further data on the VLAN to the member switch providing the notification.

As an example, prior to receiving a notification of a change to VLAN_RED, assume that switch 210-2 (and other switches supporting VLAN_RED transmit data in the network over VLAN_RED based on the VLAN identifier=3.

As shown in FIG. 4, assume in this example that switch 210-2 that receives notification from switch 210-1 that the version number for VLAN=3 has changed to a value of 2 from a previous version value of 1. Assume further that switch 210-2 does not receive a notification from the controller regarding the updated version value due to network congestion, a failure, etc.

The advertisement communication from switch 210-1 includes a VLAN identifier=3 and a corresponding version value=2. Switch 210-2 compares the received version value of 2 to the version value of 1 already stored in the switch 210-2 for the VLAN identifier=3. Based on the comparison of the received VLAN identifier and respective version value, switch 210-2 detects that there has been a change to the version value for the VLAN identifier=3. Switch 210-2 was not notified by the controller 150 of the update to VLAN identifier=3.

In response to detecting that the updated version value in the notification received from the first remote switch does not match the corresponding version value received from the VLAN controller 150, switch 2 prevents forwarding of data from switch 210-2 to switch 210-1 because the VLAN has changed. Accordingly, the version values associated with the VLANs can be used to determine whether data can be routed over a respective VLAN.

In other words, in the example embodiment as discussed above, switch 210-2 may prevent forwarding of data to switch 210-1 in response to learning that the switch 210-1 is no longer part of VLAN_RED.

However, note that not all switches 210 that support VLAN_RED were updated to VLAN_GREEN as shown in FIG. 4. Because switch 210-4 was not updated to VLAN_GREEN, switch 210-2 continues to send periodic or occasional notification of VLAN_RED to switch 210-2. As previously discussed, the periodic or occasional notification indicates a VLAN identifier value of 3 and a respective version value of 1. Because the received version value (i.e., version value 1) from switch 210-4 matches the value stored at switch 210-2, switch 210-2 can initiate forwarding of the data packet to switch 210-4. Accordingly, switch 210-2 may prevent forwarding of a respective data packet to switch 210-1 and forward the data packet on VLAN_RED to switch 210-4.

In addition to preventing forwarding of the data packet to switch 210-1 based on receipt of the VLAN update version advertisement message, the switch 210-2 can block receipt of data packets from switch 210-1 after learning that VLAN_RED has been modified or the version value has changed. The switch 210-2 can discontinue blocking receipt of data packets from switch 210-1 after the switch 210-2 receives notification from the controller 150 that the version value for VLAN identifier=3 has been updated to a version value of 2. In other words, after notification from controller 150, switch 210-2 can support routing of data over VLAN_GREEN.

Figure 5:
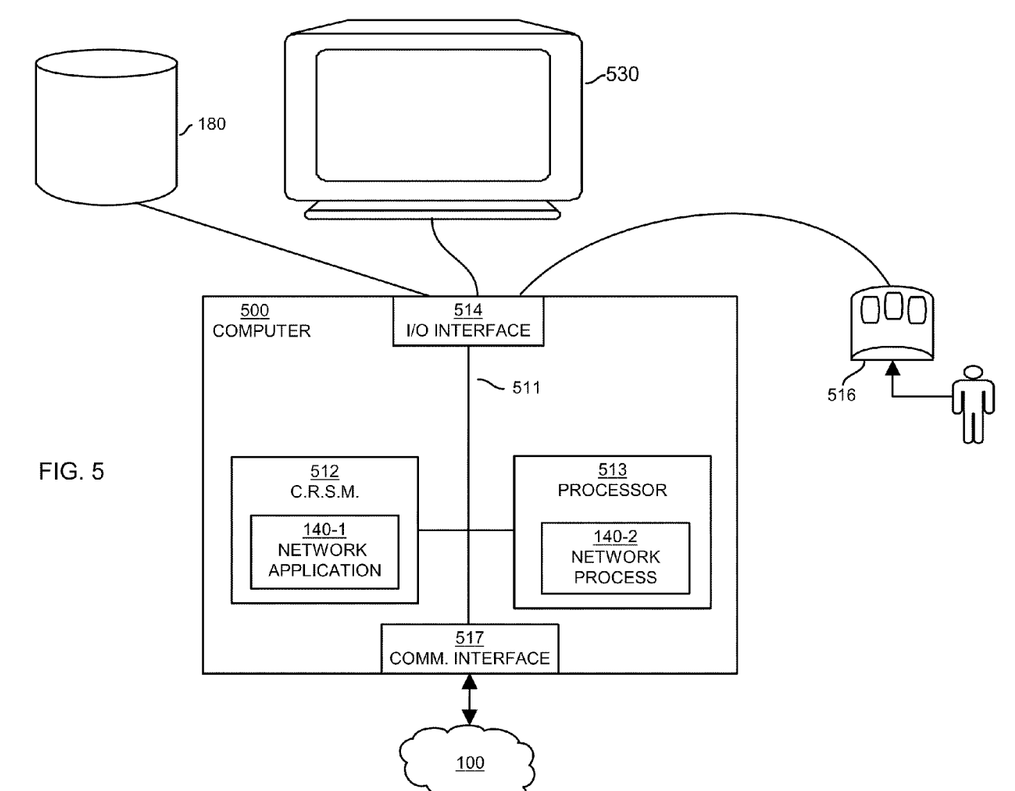
FIG. 5 is a diagram illustrating an example computer architecture for executing computer code, software, application, logic, etc., according to embodiments herein.

FIG. 5 is an example block diagram of a switch in network 100 according to embodiments herein.

Computer environment 100 can be or include a computerized device such as a personal computer, workstation, portable computing device, console, network terminal, processing device, network device, etc., operating as a switch, router, server, client, etc.

Note that the following discussion provides a basic embodiment indicating how to carry out functionality associated with handling of notifications associated with one or more failed software instructions. However, it should be noted that the actual configuration for carrying out the operations as described herein can vary depending on a respective application.

As shown, computer 500 of the present example includes an interconnect 511 that couples computer readable storage media 512 such as a non-transitory type of media in which digital information can be stored and retrieved, a processor 513 (e.g., hardware 115), I/o interface 514, and a communications interface 517.

I/o interface 514 provides connectivity to repository 180, and if present, display screen 530, peripheral devices 516 such as a keyboard, a computer mouse, etc.

Computer readable storage medium 512 can be any suitable device such as memory, optical storage, hard drive, floppy disk, etc., such as a non-transitory storage media to store network application 140-1 executed by a respective resource such as a switch to perform any of the operations as discussed herein.

Communications interface 517 enables computer environment 100 to communicate over network 100 to retrieve information from remote sources and communicate with other computers. I/o interface 514 also enables processor 513 to retrieve or attempt retrieval of stored information from repository 180.

As shown, computer readable storage media 512 can be encoded with network application 140-1 executed by processor 513 as network process 140-2.

In an example embodiment, note that the network application 140-1 also can be embodied to include a computer readable storage medium (e.g., a non-transitory media) for storing data and/or logic instructions. Computer 500 can include a processor to execute such instructions and carry out network management operations as discussed herein. Accordingly, when executed, the code associated with network application 140-1 can support processing functionality such as forwarding of data, managing version information, VLAN information, generation of version and VLAN information, etc., as discussed herein.

During operation of one embodiment, processor 513 accesses computer readable storage media 512 via the use of interconnect 511 in order to launch, run, execute, interpret or otherwise perform the instructions of network application 140-1 stored in computer readable storage medium 512. Execution of the network application 140-1 produces processing functionality in processor 513. In other words, the network process 140-2 associated with processor 513 represents one or more aspects of executing network application 140-1 within or upon the processor 513 in the computer 500.

Those skilled in the art will understand that the computer system 500 can include other processes and/or software and hardware components, such as an operating system that controls allocation and use of hardware resources to execute network application 140-1.

In accordance with different embodiments, note that computer system may be any of various types of devices, including, but not limited to, a personal computer system, desktop computer, laptop, notebook, netbook computer, mainframe computer system, handheld computer, workstation, network computer, application server, storage device, a consumer electronics device such as a camera, camcorder, set top box, mobile device, video game console, handheld video game device, a peripheral device such as a switch, modem, router, or in general any type of computing or electronic device.

Functionality supported by resources in network 100 will now be discussed via flowcharts in FIGS. 4-8. As discussed above, the network application 140-1 executed by a respective switch and/or other hardware can be configured to execute the steps in the flowcharts as discussed below.

Note that there will be some overlap with respect to concepts discussed above for FIGS. 1 through 5. Also, note that the steps in the below flowcharts need not always be executed in the order shown. The steps can be executed in any suitable order.

Figure 6:
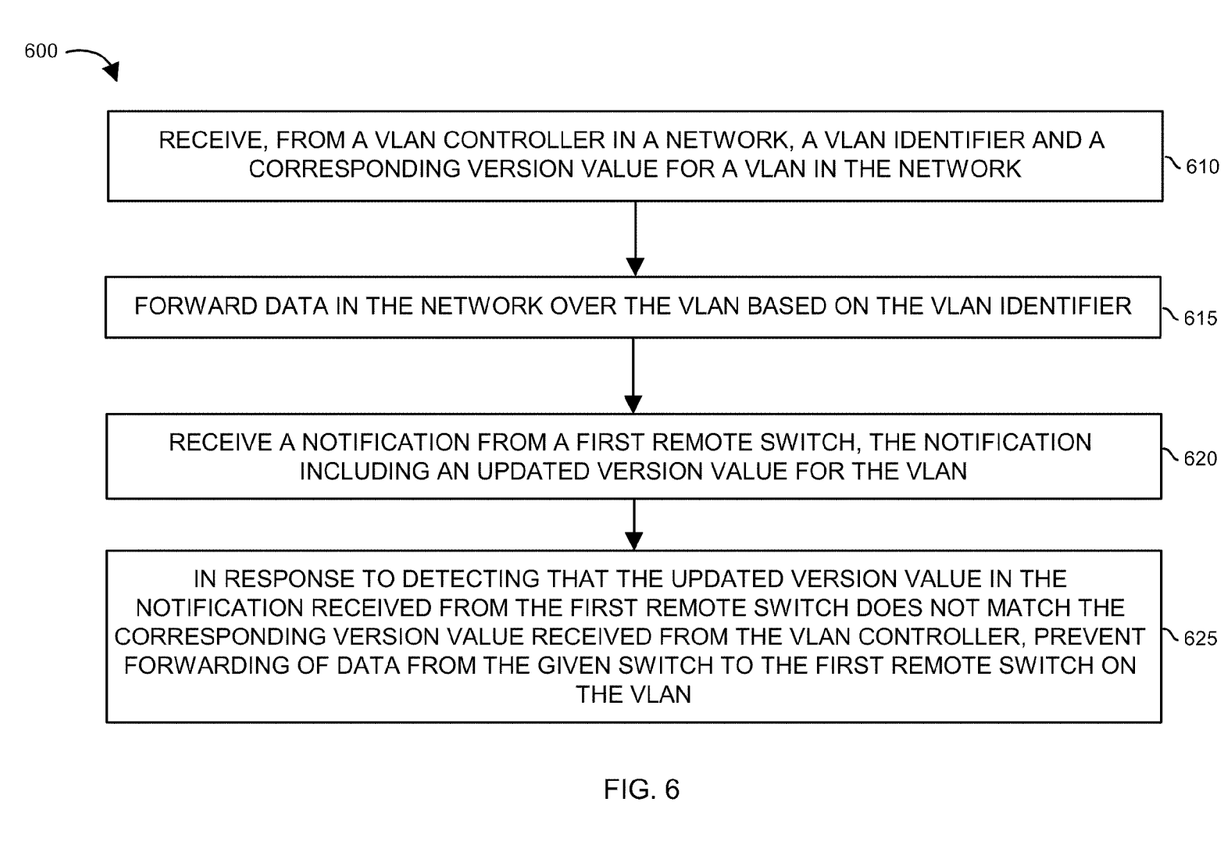
FIG. 6 is a flowchart illustrating an example method of utilizing version information according to embodiments herein.

FIG. 6 is a flowchart 600 illustrating a technique of utilizing a version value associated with a VLAN identifier according to embodiments herein.

In step 610, switch 210-2 (FIG. 2) receives, from a VLAN controller 150 in network 100, a VLAN identifier (e.g., VLAN identifier=3) and a corresponding version value (e.g., 1) for VLAN (e.g., VLAN_RED) in the network 100.

In step 615, switch 210-2 forwards data in the network 100 over the VLAN_RED based on the VLAN identifier=3.

In step 620, switch 210-2 receives a notification from remote switch 210-1. The notification from switch 210-1 includes an updated version value (e.g., version value=2) for the VLAN identifier=3.

In step 625, in response to detecting that the updated version value in the notification received from switch 210-1 does not match the corresponding version value (e.g., version value=1) previously received from the VLAN controller 150, switch 210-2 prevents forwarding of data from the switch 210-2 to the switch 210-1.

Figure 7:
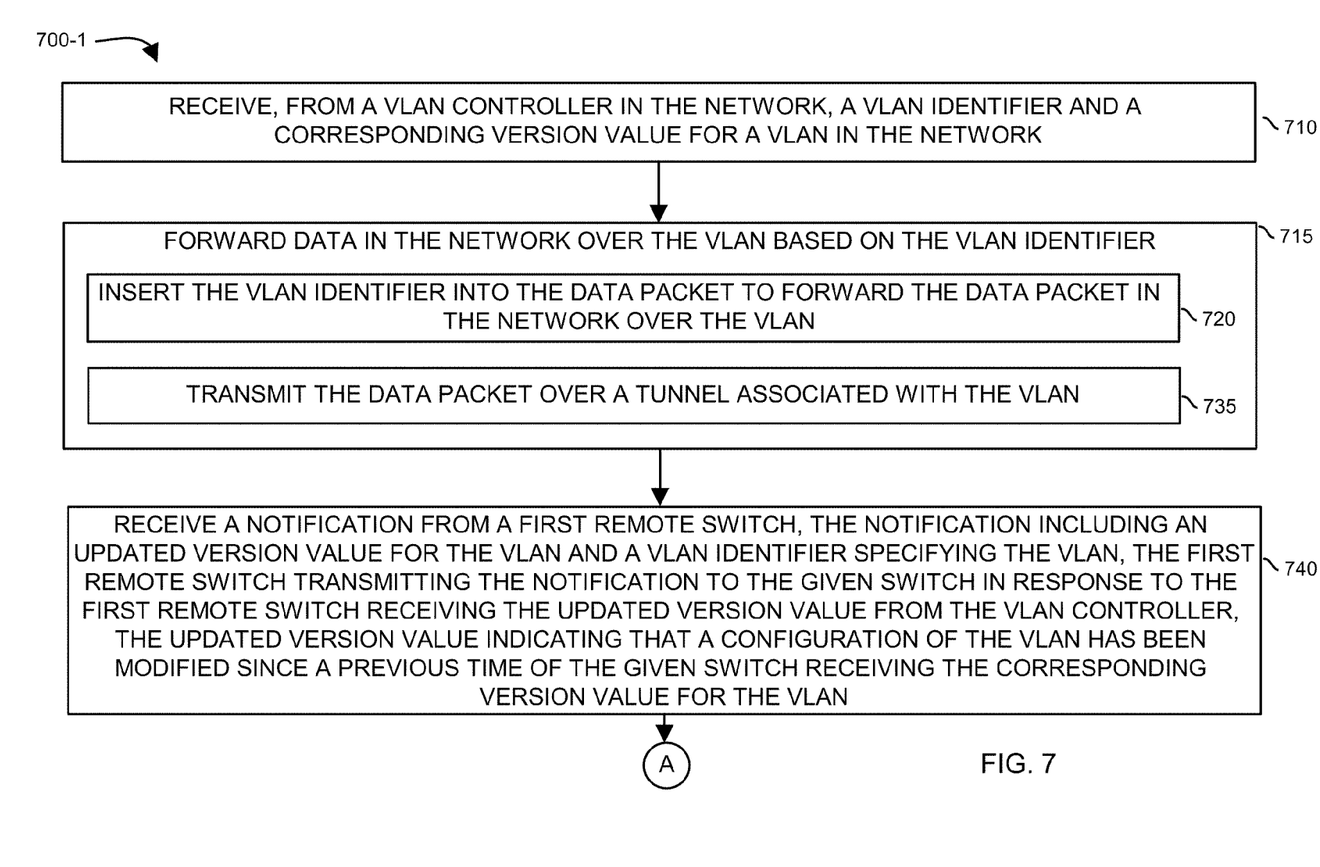
FIGS. 7 and 8 combine to form a flowchart illustrating a more specific example method of utilizing version associated with a VLAN according to embodiments herein.
Figure 8:
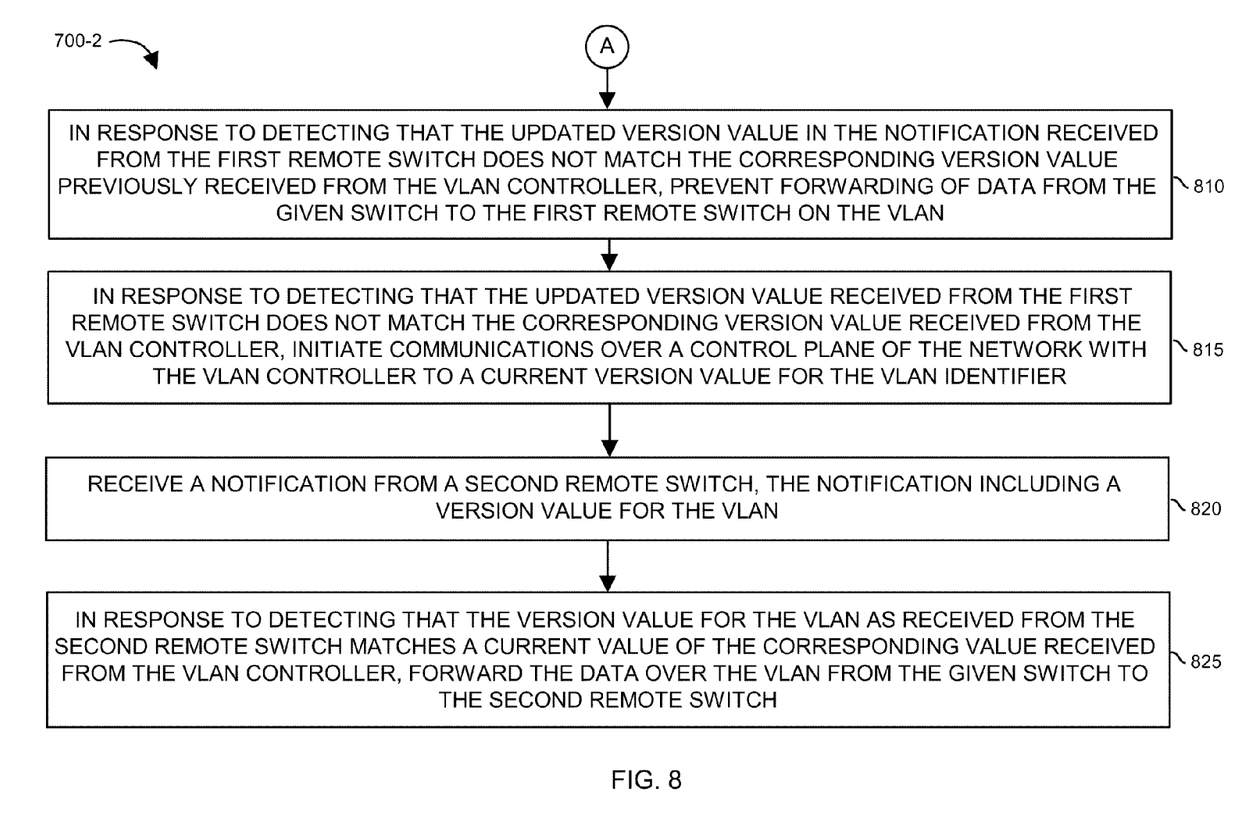

FIGS. 7 and 8 combine to form a flowchart 700 (e.g., flowchart 700-1 and flowchart 700-2) illustrating use of VLAN version information according to embodiments herein.

In step 710, switch 210-2 receives, from controller 150 in the network 100, a VLAN identifier and a corresponding version value for a respective VLAN such as VLAN_RED in the network 100.

In step 715, switch 210-2 forwards data in the network over VLAN_RED based on use of the VLAN identifier=3.

For example, in sub-step 720 of step 715, switch 210-2 receives a communication. In one embodiment, the received communication or data packet is an encapsulated 802.3 communication. The switch inserts the VLAN identifier into the data packet.

In sub-step 735 of step 735, switch 210-2 transmits the data packet over a tunnel associated with VLAN_RED as specified by a VLAN identifier (e.g., VLAN identifier of 3) in the data packet.

In step 740, assume that switch 210-2 receives a notification from a remote switch 210-1. The notification includes an updated version value for the VLAN identifier=3. In one embodiment, the remote switch 210-1 transmits the notification to the switch 210-2 in response to the remote switch 210-1 receiving the updated version value from the controller 150. The updated version value=2 indicates that a configuration of the VLAN_RED has been modified since a previous time of the switch 210-2 receiving the corresponding version value for VLAN_RED.

In step 810 of FIG. 8, in response to detecting that the updated version value in the notification received from the remote switch 210-1 does not match the corresponding version value previously received from the VLAN controller 150 by switch 210-2, the switch 210-2 prevents forwarding of data from switch 210-1 to the remote switch 210-2.

In step 815, in response to detecting that the updated version value received from switch 210-1 does not match the corresponding version value received from the controller, the switch 210-2 initiates communications over a control plane of the network with the VLAN controller 150 to receive a current version value for the VLAN identifier=3 from the controller 150.

In step 820, switch 210-2 receives a notification from remote switch 210-4. The notification includes a version value for the VLAN identifier=3.

In step 825, in response to detecting that the version value for the VLAN identifier=3 as received from the remote switch 210-4 matches a current value of the corresponding value received from the VLAN controller 150, the switch 210-2 forwards the data over VLAN_RED from the switch 210-2 to the remote switch 210-4 as switch 210-4 still appears to support VLAN_RED.

Note again that techniques herein are well suited for use in network applications such as mobility networks supporting separate control and data planes. However, it should be noted that embodiments herein are not limited to use in such applications and that the techniques discussed herein are well suited for other applications as well.

Based on the description set forth herein, numerous specific details have been set forth to provide a thorough understanding of claimed subject matter. However, it will be understood by those skilled in the art that claimed subject matter may be practiced without these specific details. In other instances, methods, apparatuses, systems, etc., that would be known by one of ordinary skill have not been described in detail so as not to obscure claimed subject matter. Some portions of the detailed description have been presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm as described herein, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing platform, such as a computer or a similar electronic computing device, that manipulates or transforms data represented as physical electronic or magnetic quantities within memories, registers, or other information storage devices, transmission devices, or display devices of the computing platform.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

We claim:

1. A method comprising:
   at a given switch configured to route data in a network, wherein the network comprises a control plane, a data plane, and a virtual local area network (VLAN):
   receiving, from a VLAN controller in the network via the control plane of the network, a first notification including a VLAN identifier for the VLAN in the network and a corresponding current version value for the VLAN in the network, wherein said current version value for the VLAN in the network indicates a current number of times there has been a change of a configuration of said VLAN;
   forwarding the data in the network over the VLAN via the data plane based on the VLAN identifier and the current version value received from the VLAN controller;
   receiving a second notification from a first remote switch in the network via the data plane, the second notification including the VLAN identifier and a first outdated version value for the VLAN, wherein the first outdated version value indicates a previous number of times there has been a change of the configuration of said VLAN;
   in response to detecting that the first outdated version value in the second notification received from the first remote switch does not match the corresponding current version value received from the VLAN controller, preventing forwarding of data on the VLAN from the given switch to the first remote switch;
   receiving a third notification from a second remote switch in the network via the data plane, the third notification including the VLAN identifier and an updated version value for the VLAN, wherein the updated version value indicates a new number of times there has been a change of the configuration of said VLAN; and forwarding the data in the network over the VLAN based on the VLAN identifier and the updated version value received from the second remote switch;

receiving a fourth notification from a third remote switch in the network via the data plane, the fourth notification including the VLAN identifier and a second outdated version value for the VLAN, wherein the second outdated version value indicates a previous number of times there has been a change of the configuration of said VLAN; and in response to detecting that the second outdated version value in the fourth notification received from the third remote switch does not match the corresponding updated version value received from the second remote switch, preventing forwarding of the data on the VLAN from the given switch to the third remote switch.

2. The method as in claim 1 further comprising:
initiating, in response to detecting that the outdated version value received from the first remote switch does not match the corresponding version value received from the VLAN controller, communications over a control plane of the network with the VLAN controller to receive, via the control plane, a current version value for the VLAN identifier.

3. The method as in claim 2 further comprising:
at the given switch:
keeping track of identities of multiple remote switches that are member resources of the VLAN; and
initiating, in response to receiving the current version value from the VLAN controller, communications to notify each of the multiple remote switches that are member resources of the VLAN of the current version value.

4. The method as in claim 3 further comprising:
receiving another notification from the first remote switch including the current version value for the VLAN via the control plane; and
forwarding, in response receiving another notification from the first remote switch including the current version value for the VLAN via the control plane, the data over the VLAN from the given switch to the first remote switch.

5. The method as in claim 1, wherein forwarding the data in the network over the VLAN via the data plane based on the VLAN identifier includes:
inserting the VLAN identifier into a data packet.

6. The method as in claim 5 further comprising:
transmitting the data packet over a tunnel associated with the VLAN.

7. The method as in claim 1 further comprising:
in response to receiving notification from a remote switch that a stored version value for the VLAN identifier has been updated to a new version value that is different than the stored version value, changing the stored version value to the new version value.

8. The method as in claim 1 further comprising:
at the given switch:
keeping track of identities of multiple remote switches in the network that are members of the VLAN; and
in response to receiving a notification from one of the multiple remote switches that a stored version value for the VLAN has been changed to a new version value, initiating communications with at least one other of the multiple remote switches that are members of the VLAN to notify of the new version value.

9. A computer system comprising:
a processor;
a memory unit that stores instructions associated with an application executed by the processor; and
an interconnect coupling the processor and the memory unit, enabling the computer system to execute the application and perform operations of:
receiving, from a VLAN controller in a network via a control plane of the network, a first notification including a VLAN identifier for a VLAN in the network and a corresponding current version value for the VLAN in the network, wherein said current version value for the VLAN in the network indicates a current number of times there has been a change of a configuration of said VLAN;
forwarding the data in the network over the VLAN via a data plane based on the VLAN identifier and the current version value received from the VLAN controller;
receiving a second notification from a first remote switch in the network via the data plane, the second notification including the VLAN identifier and a first outdated version value for the VLAN, wherein the first outdated version value indicates a previous number of times there has been a change of the configuration of said VLAN;
in response to detecting that the first outdated version value in the second notification received from the first remote switch does not match the corresponding current version value received from the VLAN controller, preventing forwarding of data on the VLAN from the given switch to the first remote switch;
receiving a third notification from a second remote switch in the network via the data plane, the third notification including the VLAN identifier and an updated version value for the VLAN, wherein the updated version value indicates a new number of times there has been a change of the configuration of said VLAN; and
forwarding the data in the network over the VLAN based on the VLAN identifier and the updated version value received from the second remote switch;
receiving a fourth notification from a third remote switch in the network via the data plane, the fourth notification including the VLAN identifier and a second outdated version value for the VLAN, wherein the second outdated version value indicates a previous number of times there has been a change of the configuration of said VLAN; and
in response to detecting that the second outdated version value in the fourth notification received from the third remote switch does not match the corresponding updated version value received from the second remote switch, preventing forwarding of the data on the VLAN from the given switch to the third remote switch.

10. The computer system as in claim 9, wherein the application further supports operations of:
initiating, in response to detecting that the outdated version value received from the first remote switch does not match the corresponding version value received from the VLAN controller, communications over a control plane of the network with the VLAN controller to receive, via the control plane, a current version value for the VLAN identifier.

11. The computer system as in claim 10, wherein the application further supports operations of:
keeping track of identities of multiple remote switches that are member resources of the VLAN; and initiating, in response to receiving the current version value from the VLAN controller, communications to notify each of the multiple remote switches that are member resources of the VLAN of the current version value.

12. The computer system as in claim 11, wherein the application further supports operations of:
receiving another notification from the first remote switch including the current version value for the VLAN via the control plane; and
forwarding, in response receiving another notification from the first remote switch including the current version value for the VLAN via the control plane, the data over the VLAN from the given switch to the first remote switch.

13. The computer system as in claim 9, wherein forwarding the data in the network over the VLAN via the data plane based on the VLAN identifier:
inserting the VLAN identifier into a data packet.

14. The computer system as in claim 13, wherein the application further supports operations of:
transmitting the data packet over a tunnel associated with the VLAN.

15. The computer system as in claim 9, wherein the application further supports operations of:
in response to receiving notification from a remote switch that a stored version value for the VLAN identifier has been updated to a new version value that is different than the stored version value, changing the stored version value to the new version value.

16. The computer system as in claim 9, wherein the application further supports operations of:
keeping track of identities of multiple remote switches in the network that are members of the VLAN; and
in response to receiving a notification from one of the multiple remote switches that a stored version value for the VLAN has been changed to a new version value, initiating communications with at least one other each of the multiple remote switches that are members of the VLAN to notify of the new version value.

17. A non-transitory computer-readable storage medium having instructions stored thereon for processing data information, such that the instructions, when carried out by a processing device, cause the processing device to perform operations of:
receiving, from a VLAN controller in a network, via a control plane of the network, a first notification including a VLAN identifier for a VLAN in the network and a corresponding current version value for the VLAN in the network, wherein said current version value for the VLAN in the network indicates a current number of times there has been a change of a configuration of said VLAN;
forwarding the data in the network over the VLAN via a data plane based on the VLAN identifier and the current version value received from the VLAN controller;
receiving a second notification from a first remote switch in the network via the data plane, the second notification including the VLAN identifier and a first outdated version value for the VLAN, wherein the first outdated version value indicates a previous number of times there has been a change of the configuration of said VLAN;
in response to detecting that the first outdated version value in the second notification received from the first remote switch does not match the corresponding current version value received from the VLAN controller, preventing forwarding of data on the VLAN from the given switch to the first remote switch;
receiving a third notification from a second remote switch in the network via the data plane, the third notification including the VLAN identifier and an updated version value for the VLAN, wherein the updated version value indicates a new number of times there has been a change of the configuration of said VLAN; and
forwarding the data in the network over the VLAN based on the VLAN identifier and the updated version value received from the second remote switch;
receiving a fourth notification from a third remote switch in the network via the data plane, the fourth notification including the VLAN identifier and a second outdated version value for the VLAN, wherein the second outdated version value indicates a previous number of times there has been a change of the configuration of said VLAN; and
in response to detecting that the second outdated version value in the fourth notification received from the third remote switch does not match the corresponding updated version value received from the second remote switch, preventing forwarding of the data on the VLAN from the given switch to the third remote switch.

* * * * *